(12) United States Patent
Toyoda

(10) Patent No.: US 7,450,479 B2
(45) Date of Patent: Nov. 11, 2008

(54) DISK RECORDING APPARATUS FOR RECORDING DATA BY USING ZONE CLV TECHNOLOGY

(75) Inventor: Masaki Toyoda, Toyo (JP)

(73) Assignee: Panasonic Corporation, Osaka (JP)

( * ) Notice: Subject to any disclaimer, the term of this patent is extended or adjusted under 35 U.S.C. 154(b) by 354 days.

(21) Appl. No.: 10/547,511

(22) PCT Filed: Mar. 17, 2004

(86) PCT No.: PCT/JP2004/003592

§ 371 (c)(1),
(2), (4) Date: Aug. 31, 2005

(87) PCT Pub. No.: WO2004/084207

PCT Pub. Date: Sep. 30, 2004

(65) Prior Publication Data

US 2006/0158767 A1    Jul. 20, 2006

(30) Foreign Application Priority Data

Mar. 18, 2003   (JP)   .............................. 2003-072872

(51) Int. Cl.
*G11B 7/095* (2006.01)
(52) U.S. Cl. ............... 369/47.44; 369/44.32; 369/53.14
(58) Field of Classification Search ........................ None
See application file for complete search history.

(56) References Cited

U.S. PATENT DOCUMENTS 5,808,978 A * 9/1998 Wang et al. ............... 369/44.28
6,324,140 B1 * 11/2001 Kgami et al. ............. 369/53.18
2002/0051412 A1 * 5/2002 Kawashima et al. ...... 369/47.39
2002/0131350 A1 * 9/2002 Kurobe et al. .............. 369/47.4
2003/0099175 A1 * 5/2003 Chan ....................... 369/53.14

FOREIGN PATENT DOCUMENTS

| JP | 5-303826 | 11/1993 |
|---|---|---|
| JP | 2001-176193 | 6/2001 |
| JP | 2002-324322 | 11/2002 |
| JP | 2002-367277 | 12/2002 |
| JP | 2003-67935 | 3/2003 |

OTHER PUBLICATIONS

DOS/V Magazine, vol. 11, No. 20, pp. 147-160, SoftBank Publishing, Tokyo, Japan, Oct. 15, 2002.

* cited by examiner

*Primary Examiner*—Michael V Battaglia
(74) *Attorney, Agent, or Firm*—Dickinson Wright, PLLC

(57) ABSTRACT

There is provided a disk recording apparatus capable of minimizing a servo error and recording in the last zone at the maximum one of the recording speeds specified in the apparatus or disk recording medium even if the disk recording medium is in poor condition. At any position during disk activation, an axial-run-out and eccentricity measuring circuit (115) measures the eccentricity of the disk recording medium. A CPU (101) calculates the upper-limit rotation speed from the measurement, divides the recording area into zones in such a manner that the disk recording medium rotates at speeds lower or equal to the upper-limit rotation speed, determines the maximum one of the recording speeds specified in the apparatus and supported by the disk recording medium for each zone, sets a zone CLV table, and stores the table in a RAM (102). Then, the recording speeds are changed at zone boundaries according to the zone CLV table set based on the upper-limit rotation speeds calculated from the eccentricities.

4 Claims, 10 Drawing Sheets

FIG. 3

| ATIP(Min) | radius(mm) | CLV Speed | RotateSpeed(rpm) | XferRate(KB/s) |
|---|---|---|---|---|
| 00:00:00 | 25.00 | 10 | 4584 | 1500 |
| 14:00:00 | 33.74 | 16 | 5434 | 2400 |
| 52:00:00 | 50.32 | 24 | 5466 | 3600 |

FIG. 4

| ATIP(Min) | radius(mm) | CLV Speed | RotateSpeed(rpm) | XferRate(KB/s) |
|---|---|---|---|---|
| 00:00:00 | 25.00 | 10 | 4584 | 1500 |
| 20:00:00 | 36.86 | 16 | 4975 | 2400 |
| 66:00:00 | 55.18 | 24 | 4984 | 3600 |

FIG. 5

| ATIP(Min) | radius(mm) | CLV Speed | RotateSpeed(rpm) | XferRate(KB/s) |
|---|---|---|---|---|
| 00:00:00 | 25.00 | 10 | 4584 | 1500 |
| 27:00:00 | 40.19 | 16 | 4562 | 2400 |

DISK RECORDING APPARATUS FOR RECORDING DATA BY USING ZONE CLV TECHNOLOGY

The present application is based on International Application PCT/JP2004/003592, filed Mar. 17, 2004, which application is incorporated herein by reference in its entirety.

TECHNICAL FIELD

The present invention relates to a disk recording apparatus for recording data on a disk recording medium such as a CD-R and CD-RW by using Zone CLV technology.

BACKGROUND ART

Some CD-R/RW recording apparatus emerged in recent years use zone CLV technology, which divides a recording area of a constant-linear-density-formatted disk recording medium into a plurality of sub-recording-areas (hereinafter referred to as zones) and records data in different zones at different constant recording speeds (recording rotation speeds) (see Japanese Patent Laid-Open No. 2001-176193, for example).

One conventional method for zoning and determine a recording speed for each zone is to divide the recording area into zones and determine a recording speed for each zone such that recording in the last zone is performed at the maximum recording speed specified for an apparatus or a disk recording medium in the last zone.

When a boundary between zones (speed change position) is detected to change the recording speed during recording, the recording is suspended, information about the recording speed for the next zone is used to change parameter settings, then a seek is done to a position before the speed change position, data is reproduced at a new recording rotation speed in the section from the seek position to the speed change position and servo controls are performed.

However, if zoning is done so that recording in the last zone is performed at the maximum recording speed specified for an apparatus or disk recording medium, the disk recording medium rotates more faster for recording in zones near the outer edge than for recording in zones near the center. Accordingly, when data is recorded on a poor-condition disk recording medium with a high axial run-out or eccentricity, the servo error may increase in zones nearer the outer edge of the disk recording medium and a servo failure may occur when servo control is performed. If such a servo failure occurs in a conventional recording apparatus, the apparatus makes a predetermined number of retries, then determines that the disk is non-recordable and ends the recording.

When a conventional disk recording apparatus detects an eccentricity during activation of a disk and determines based on the detection that data cannot be recorded on the disk at the maximum recording speed, it divides the recording area into zones and determines the recording speed for each zone in such a manner that the recording speed does not reaches the maximum recording speed in the last zone. However, this method has the problem that recording takes more time because recording in the last zone is performed at a lower speed than the maximum recording speed.

In the case of packet recording, if the packet recording ends at a position immediately following a recording speed change position, changing the recording speed can add to the recording time, depending on the amount of packet data.

In the case of track-at-once recording, after content data is recorded, a read-in area and then a read-out area are recorded as session closing process. A conventional disk recording apparatus changes the recording speed even if a speed change position is within the read-in or read-out area. In such a case, too much time is wasted in the session closing operations.

Furthermore, if buffer-under-run, which can occur when a host computer cannot steadily supply data during recording, occurs and recording is halted, the recording will be resumed at the position where the recording was halted at the same recording speed as before the halt. Depending on the condition of the disk recording medium, however, recording cannot be performed at the same speed as before halt. That is, if a buffer-under-run occurs, the recording apparatus must make a seek to a position before the position at which recording has been halted to resume the recording as same speed as before halt and reproduce data in the section from the seek position to the position at which the halt has occurred at the same rotation speed as before the halt in order to perform servo control. However, depending on the condition of the disk recording medium, such servo control cannot properly be performed and consequently a servo failure may occur. In such a case, a conventional disk recording apparatus makes a predetermined number of retries, then assumes the disk to be non-recordable, and ends recording.

DISCLOSURE OF INVENTION

In view of the problems described above, an object of the present invention is to provide a disk recording apparatus capable of minimizing the servo error and performing recording in the last zone of a disk recording medium at the maximum recording speed specified for the apparatus or disk recording medium even if the disk recording medium is in poor condition by: measuring at a given position during activation of a disk, or before and/or after the recording starting position when starting recording (including only before the recording starting position or only after the recording staring position), the eccentricity or axial run-out of the disk recording medium or the capability of reading time information recorded on the disk recording medium; calculating the upper-limit rotation speed from the result of the measurement; dividing a recording area into zones in such a manner that the disk recording medium rotates at speeds lower or equal to the upper-limit rotation speed; and selecting and setting for each zone the maximum one of the recording speeds specified in the apparatus and supported by the disk recording medium. Because the servo error is minimized, the occurrence of servo failures can be avoided. Furthermore, rather than recording in the last zone is performed at a speed lower than the maximum recording speed as in the prior art, data can be recorded at the maximum recording speed even on a poor-condition disk recording medium, therefore recording time can be reduced.

In some cases, even if the upper-limit rotation speed is calculated from a measurement such as an eccentricity and zoning is done and a rotation speed is set for each zone based on the upper-limit rotation speed, servo control may fail at a newly set rotation speed and the disk may be regarded as a non-recordable disk, and then the recording may be aborted, depending on the condition of the disk recording medium. Therefore, another object of the present invention is to provide a disk recording apparatus that, if it fails to record at a newly set recording speed, can continue recording at any of the recording speeds set for the zones that is lower than the newly set recording speed.

Yet another object of the present invention is to provide a disk recording apparatus that measures the time interval between receptions of a record command from a host computer during packet recording so that it can continue recording without changing the recording speed even if the packet recording continues past a speed change position, provided that the interval between record command receptions is within a predetermined time interval, thereby saving the time required for changing speed (speed change time). Thus, recording time taken for packet recording that ends at a position immediately following a speed change position can be reduced.

Yet another object of the present invention is to provide a disk recording apparatus that, if it encounters a speed change position in a read-in area or a read-out area during a session closing process in track-at-once recording, can continue the session closing process at the same recording speed at which it starts recording in the read-in area, thereby avoiding an increase in time required for the session closing process due to speed change.

Yet another object of the present invention is to provide a disk recording apparatus that, if recording is halted and recording is resumed at the same recording speed as before the halt and the recording fails, can continue recording at any of the recording speeds set for the zones that is lower than the recording speed before halt.

A disk recording apparatus according to the first aspect of the present invention includes: a unit for rotating a constant-linear-density-formatted disk recording medium at a plurality of rotation speeds; a unit for measuring at any position during disk activation the eccentricity of the disk recording medium, or the axial run-out of the disk recording medium, or the readability of time information recorded on the disk recording medium; and a table setting unit for calculating an upper-limit rotation speed based on the measurement of the eccentricity, the axial run-out or the time information readability, and dividing a recording area of the disk recording medium into a plurality of sub-recording-areas and setting the maximum recordable rotation speed from among the plurality of rotation speeds for each of the sub-recording-areas so that rotation exceeding the upper-limit rotation speed is prevented; wherein the time information recorded on the disk recording medium is read and, when a boundary of each of the sub-recording-area is found, the rotation speed is changed according to the table set by the table setting unit and recording is performed at the changed speed.

A disk recording apparatus according to the second aspect of the present invention includes: a unit for rotating a constant-linear-density-formatted disk recording medium at a plurality of rotation speeds; a unit for measuring, at a position before or after a recording starting position when recording is started, the eccentricity of the disk recording medium, or the axial run-out of the disk recording medium, or the readability of time information recorded on the disk recording medium; a table setting unit for calculating an upper-limit rotation speed based on the measurement of the eccentricity, the axial run-out or the time information readability, and dividing a recording area of the disk recording medium into a plurality of sub-recording-areas and setting the maximum recordable rotation speed from among the plurality of rotation speeds for each of the sub-recording-areas so that the disk recording medium rotates at a speed that does not exceed the upper-limit rotation speed; wherein the time information recorded on the disk recording medium is read and, when a boundary of each of the sub-recording-area is found, the rotation speed is changed according to the table set by the table setting unit and recording is performed at the changed speed.

According to the third aspect of the present invention, there is provided the disk recording apparatus according to the first or the second aspect, wherein if recording at the changed rotation speed fails, recording is performed at any of the plurality of recording speeds that is lower than the changed rotation speed.

According to the fourth aspect of the present invention, there is provided the disk recording apparatus according to any one of the first to third aspects, comprising a unit for measuring the interval between record command receptions during packet recording, wherein if a boundary of the sub-recording-area is found during packet recording and the interval between record command receptions is within a predetermined time interval, the rotation speed is not changed and recording is performed at the same rotation speed. According to the fifth aspect of the present invention, there is provided the disk recording apparatus according to anyone of the first to fourth aspects, wherein if track-at-once session closing process is performed, the rotation speed at which recording in a read-in area is started is maintained to perform recording in the read-in area and a read-out area.

According to the sixth aspect of the present invention, there is provided the disk recording apparatus according to any one of the first to fifth aspects, wherein if recording is halted, the recording is resumed at the rotation seed that is set during the halt and, if the recording fails, the recording is performed at any of the plurality of recording speeds that is lower than the rotation speed set before the halt.

According to the present invention as described above, the eccentricity or axial run-out or the readability of time information at any position during disk activation is measured, the upper-limit rotation speed is calculated from the result of the measurement, the recording area is divided into zones (sub-recording-areas) in such a manner that the disk recording medium rotates at speeds lower or equal to the upper-limit rotation speed and the maximum one of the recording speeds specified in the apparatus and supported by the disk recording medium is set for each zone, therefore, a servo error can be minimized and, even if the disk recording medium is in bad condition, recording in the last zone can be performed at the maximum recording speed specified for the apparatus or disk recording medium. Thus, servo failures can be avoided and, even if the disk recording medium is in bad condition, recording in its last zone can be performed at the maximum recording speed, rather than a speed lower than the maximum speed as in a conventional apparatus. Consequently, the recording time can be reduced.

Furthermore, the eccentricity or axial run-out or the readability of time information may be measured at a position before and/or after the recording starting position including only before the recording starting position or only after the recording starting position when recording is started and the upper-limit rotation speed may be calculated from the result of the measurement. Thus, a more optimum relationship between the recording starting position and recording speed and therefore more stable recording can be achieved.

If recording at a changed recording speed fails, the recording can be continued at any of the recording speeds set for each zone (sub-recording-area) that is lower than the changed recording speed.

In the case of packet recording, the interval between record command receptions from host computer is measured and, if a boundary of a zone (sub-recording-area) is detected and the interval between the record command receptions is within a predetermined time, the recording speed is not changed but the recording is continued at the same rotation speed. Thus, the speed change time can be reduced. Accordingly, the recording time taken for packet recording that ends at a position immediately following a speed change position can be reduced.

In the case of track-at-once session closing process, if a boundary (speed change position) of a zone (sub-recording-area) is found in a read-in area or a read-out area, the recording speed is not changed and the session closing process is continued while the rotation speed used when the recording in the read-in area was started is kept. Thus, an increase in time taken for the session closing process by changing the speed can be avoided. In addition, the session closing process can be performed in a stable state because the recording speed is kept constant.

If recording is halted and then the recording resumed at the recording speed that was being used at the time of the halt fails, the recording can be continued at any of the recording speeds set for each zone (sub-recording-area) that is lower than the recording speed used at the time of the halt.

BRIEF DESCRIPTION OF THE DRAWINGS

FIG. 3 shows an exemplary zone CLV table according to the first embodiment of the present invention;

FIG. 4 shows another exemplary zone CLV table according to the first embodiment of the present invention;

FIG. 5 shows another exemplary zone CLV table according to the first embodiment of the present invention;

BEST MODE FOR CARRYING OUT THE INVENTION

Embodiments of the present invention will be described below with reference to the accompanying drawings. The embodiments are illustrative only and not limitative.

FIRST EMBODIMENT

Figure 1:
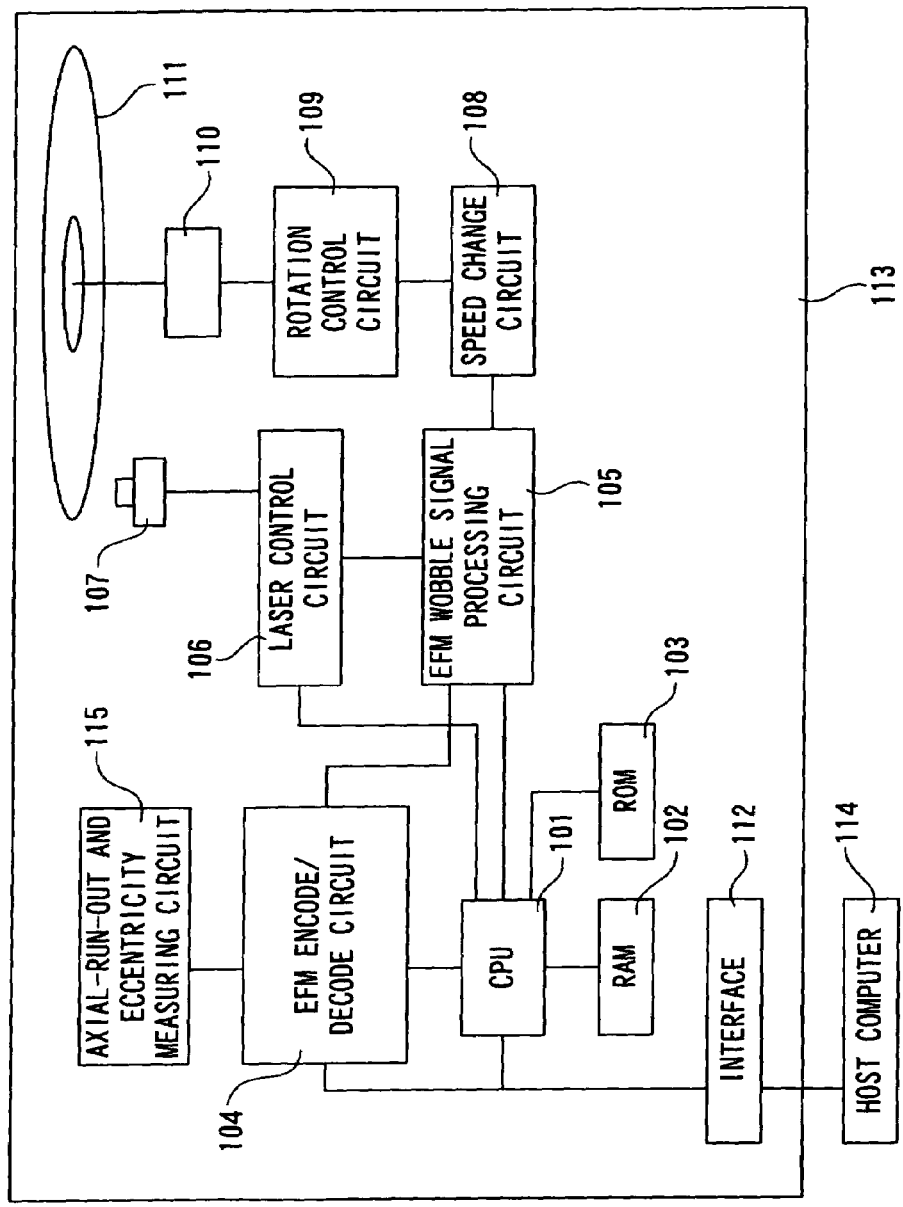
FIG. 1 is a diagram showing a configuration of a disk recording apparatus according to a first embodiment of the present invention.

FIG. 1 shows a configuration of a disk recording apparatus according to a first embodiment of the present invention. The disk recording apparatus may be a CD-R drive or a CD-RW drive capable of recording data by using zone CLV technology on a constant-linear-density-formatted disk recording medium, such as a CD-R or CD-RW.

In FIG. 1, a CPU (Central Processing Unit) 101 controls the operation of the entire apparatus according to information such as a zone CLV tabled stored in a memory device, RAM 102, and programs stored in another memory device, ROM 103. The zone CLV table will be described later.

An EFM (Eight-to-Fourteen modulation) encode/decode circuit 104 applies encoding such as interleaving to data to be recorded and then EFM-modulates the resulting data into an EFM signal during data recording. During reproduction, it EFM-demodulate an EFM signal or wobble signal inputted from an EFM wobble signal processing circuit 105 and then applies decoding such as deinterleaving to the demodulated signal to generate reproduction data. The EFM encode/decode circuit 104 also performs servo controls using signals such as a tracking error signal inputted from the EFM wobble signal processing circuit 105.

The EFM wobble signal processing circuit 105 processes a signal provided from an optical pickup 107 to generate an EFM signal, wobble signal, or tracking error signal and provides it to the EFM encode/decode circuit 104. A wobble signal is a signal emitted when a region on a wobbled disk recording medium in which no pit is radiated with laser.

A laser control circuit 106 controls laser emission by the optical pickup 107 and controls the power of the laser beam according to instructions from the CPU 101. The optical pickup 107 emits a laser beam and also receives its reflected beam, converts it into an electric signal, and provides it to the EFM wobble signal processing circuit 105.

In a speed change circuit 108, rotation speeds (for example, 10×, 16×, and 24× speeds) are set by the CPU 101. A rotation control circuit 109 drives a motor 110 according to a rotation speed set in the speed change circuit 108. The motor 110 rotates a disk recording medium 111 at a constant linear velocity equivalent to a rotation speed set in the speed change circuit 108. The disk recording medium 111 may be a writable disk such as a CD-R and CD-RW, for example. The unit for rotating a disk recording medium at a number of rotation speeds in the first embodiment consists of the CPU 101, RAM 102, ROM 103, speed change circuit 108, rotation control circuit 109, and motor 110.

An interface 112 connects the disk recording apparatus 113 to a host computer 114. The host computer 114 sends data to the disk recording medium 111 through the interfaces 112.

An axial-run-out and eccentricity measuring circuit 115 measures an eccentricity from a tracking error signal inputted into the EFM encode/decode circuit 104 and also measures an axial-run-out from the eccentricity. While the eccentricity is measured from a tracking error signal in the first embodiment, it may be measured otherwise, of course.

Speed change operation of the disk recording apparatus 113 will be described below. Data read from a disk recording medium 111 includes time information known as SubQ or ATIP (Absolute Time In Pre-groove), which is information relating to a position on the disk recording medium 111. The CPU 101 can detect a speed change position (zone boundary) by using SubQ or ATIP decoded by the EFM encode/decode circuit 104 and a zone CLV table, which will be described later. When it detects a speed change position, suspends recording or reproduction, sets a rotation speed (recording speed/reproduction speed) for the next zone in the speed change circuit 108 and the EFM decode/encode circuit 104 according to the zone CLV table and changes parameters, then seeks to a position before the speed change position, and reproduces data in the section from the seek position to the speed change position at the new rotation speed to perform servo controls (a speed change process). Thus, the speed change incurs an amount of speed change time.

Figure 2:
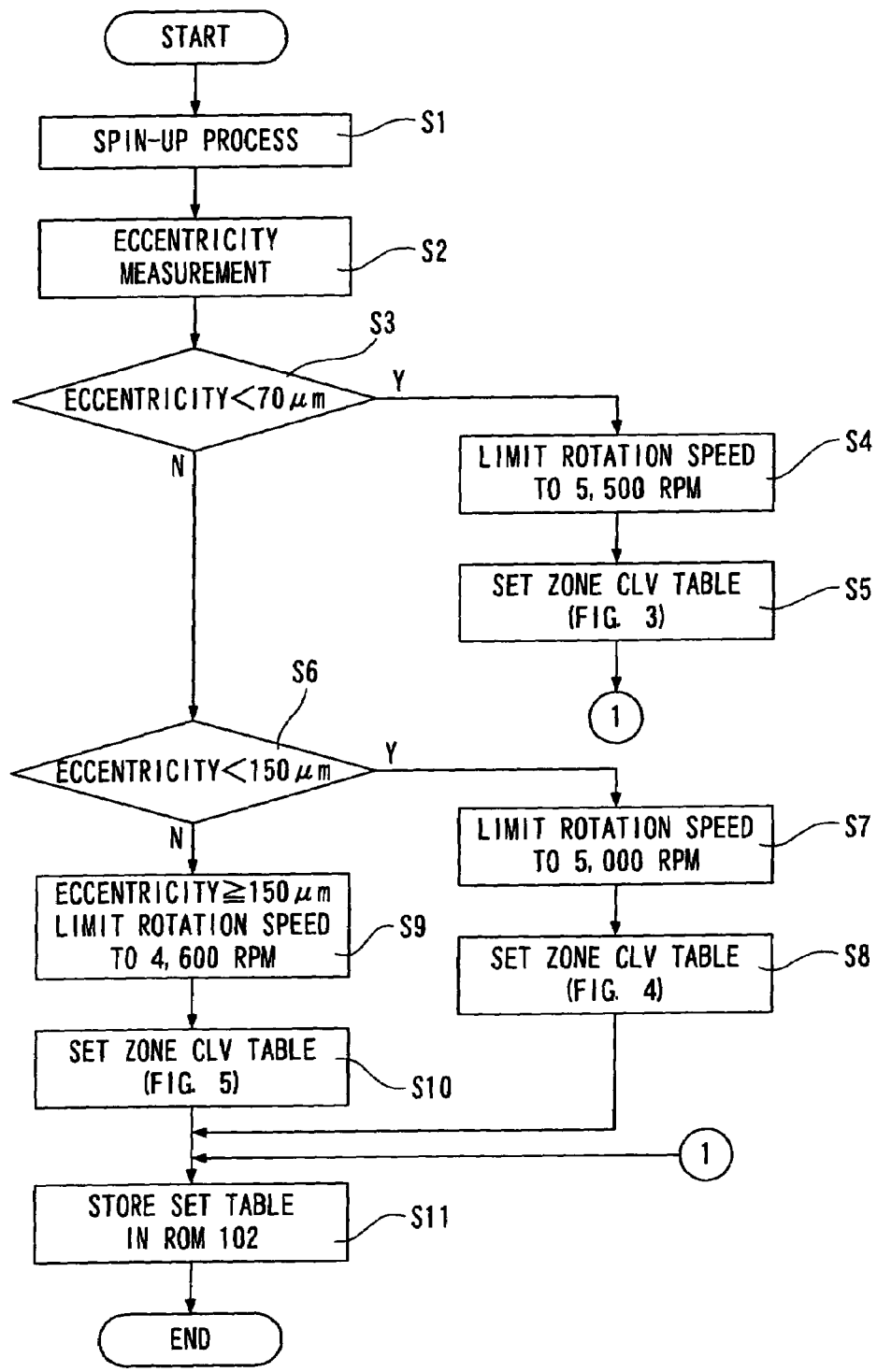
FIG. 2 is a flowchart of an operation performed during activation of a disk of a disk recording apparatus according to the first embodiment of the present invention.

Operation of the disk recording apparatus 113 during disk activation will be described with reference to the flowchart in FIG. 2. It is assumed in the first embodiment that 24× speed is set as the maximum recording speed of the apparatus 113 and the disk recording medium 111 and 5,500 rpm is specified as the maximum rotation speed of the apparatus 113.

When the disk recording medium 111 is placed in the apparatus 113, the CPU 101 first sets a specified rotation speed in the speed change circuit 108. The speed change circuit 108 sends a signal to the rotation control circuit 109 to cause it drive the motor 110 at the set rotation speed, then performs at step S1 a spin-up process for rotating the disk recording medium 111 at the specified rotation speed.

After the completion of the spin-up process, the CPU 101 directs the axial-run-out and eccentricity measuring circuit 115 to measure the eccentricity of a predetermined position at the specified rotation speed (step S2). The specified rotation speed and the predetermined position may be any values.

The CPU 101 reads the eccentricity measured by the axial-run-out and eccentricity measuring circuit 115 and determines whether the eccentricity is smaller than 70 μm (step S3). If the determination at step S3 is affirmative, that is, if the eccentricity is smaller than 70 μm, the process proceeds to step S4, where the CPU 101 makes a setting so as to limit the upper-limit rotation speed to a maximum rotation speed of 5,500 rpm specified in the apparatus at step S4. Then, at step S5, it uses the upper-limit rotation speed (5,500 rpm) information, the recording speed (recording rotation speed) information specified in the apparatus, and the recording speed information that is specified in the disk recording medium and was read in the spin-up process to divide the recording area into zones in such a manner that the disk recording medium is not rotated at a speed exceeding the upper-limit rotation speed (5,500 rpm), and also to choose for each zone the maximum recording speed from among the recording speeds that are specified in the apparatus and supported by the disk recording medium. Then the CPU 101 sets the zone CLV table as shown in FIG. 3 and proceeds to step S11.

In this way, when the apparatus in the first embodiment records data on a disk recording medium in good condition that has a eccentricity smaller than 70 μm, it sets the upper-limit rotation speed to a maximum rotation speed of 5,500 rpm which is specified in the apparatus and provides a zone CLV table (see FIG. 3) in which the recording speed for the last zone is set to the maximum recording speed (24× speed).

If the determination at step S3 is negative, that is, if the eccentricity is greater than 70 μm, then the process proceeds to step S6, where determination is made as to whether the eccentricity is smaller than 150 μm. If the determination at step S6 is affirmative, that is, if the eccentricity is less than 150 μm, then the process proceeds to step S7, where a setting is made so as to limit the upper-limit rotation speed to 5,000 rpm, which is lower than a maximum rotation speed of 5,500 rpm, and then an operation similar to that in step S5 is performed at step S8 is performed to provide the zone CLV table as shown in FIG. 4. Then the process proceeds to step S11.

In this way, if the apparatus in the first embodiment records data on a bad-condition disk recording medium having an eccentricity greater than 70 μm and the eccentricity is smaller than 150 μm, it sets the upper-limit rotation rate to 5,000 rpm to provide a zone CLV table so that the recording speed for the last zone is set to the maximum recording speed (24× speed) and data can be recorded up to the last track of the disk recording medium (see FIG. 4)

If the determination at step S6 is negative, that is, if the eccentricity is greater than 150 μm, then the process proceeds to step S9, where a setting is made so as to limit the upper-limit rotation speed to 4,600 rpm, which is lower than 5,000 rpm, then an operation similar to that in step S5 is performed at step S10 to provide the zone CLV table as shown in FIG. 5. Then the process proceeds to step S11.

In this way, if the apparatus in the first embodiment records data on a bad-condition disk recording medium having an eccentricity greater than 150 μm, it sets the upper-limit rotation speed to 4,600 rpm so as to provide a zone CLV table that allows data to be recorded up to the last track of the disk recording medium (see FIG. 4).

The table setting unit according to the first embodiment consists of the CPU 101, RAM 102, and ROM 103.

At step S1, the set zone CLV table is stored in the RAM 102 in preparation for recording. When the CPU 101 receives a record instruction from the host computer 114 through the interface 112, the CPU 101 refers to the zone CLV table stored in the RAM 102 to set in the speed change circuit 108 and the EFM encode/decode circuit 104 the recording speed to be used at a recording starting position.

In this way, in the first embodiment, one of a plurality of upper-limit rotation speeds is set according to the measurement of the eccentricity to enable recording at the maximum recording speed (24× speed) in the last zone even on a bad-condition disk recording medium.

Figure 6:
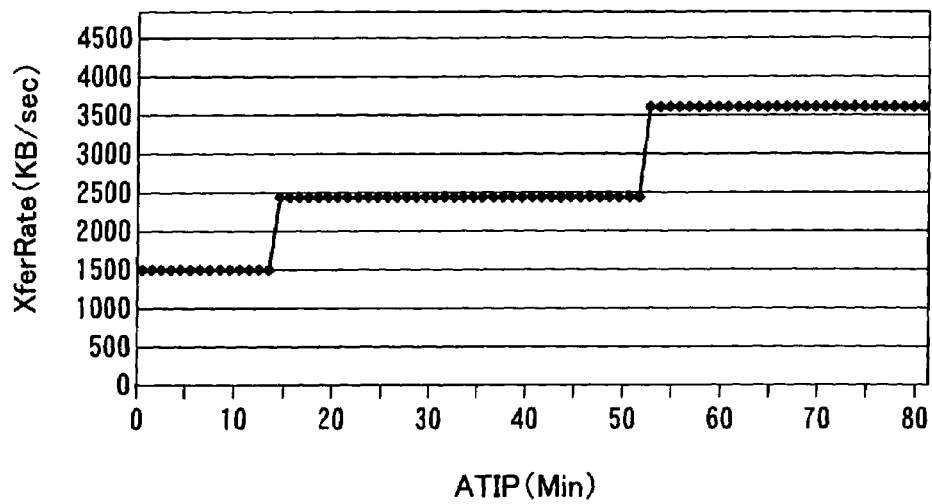
FIG. 6 shows a relationship between a transfer rate and ATIP where the zone CLV table shown in FIG. 3 is used for recording in the disk recording apparatus according to the first embodiment of the present invention.
Figure 7:
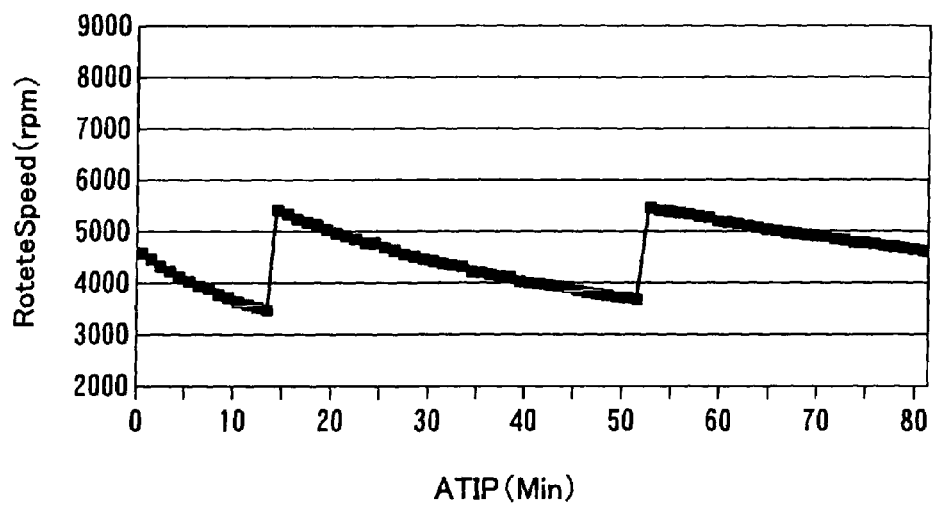
FIG. 7 shows a relationship between a rotation speed and ATIP when the zone CLV table shown in FIG. 3 is used for recording in the disk recording apparatus according to the first embodiment of the present invention.

FIG. 6 shows the relationship between the transfer rate (Xfer Rate) and ATIP in the case where the zone CLV table shown in FIG. 3 is used for recording. The relationship between the rotation speed (Rotate Speed) and ATIP in the same case is shown in FIG. 7.

Figure 8:
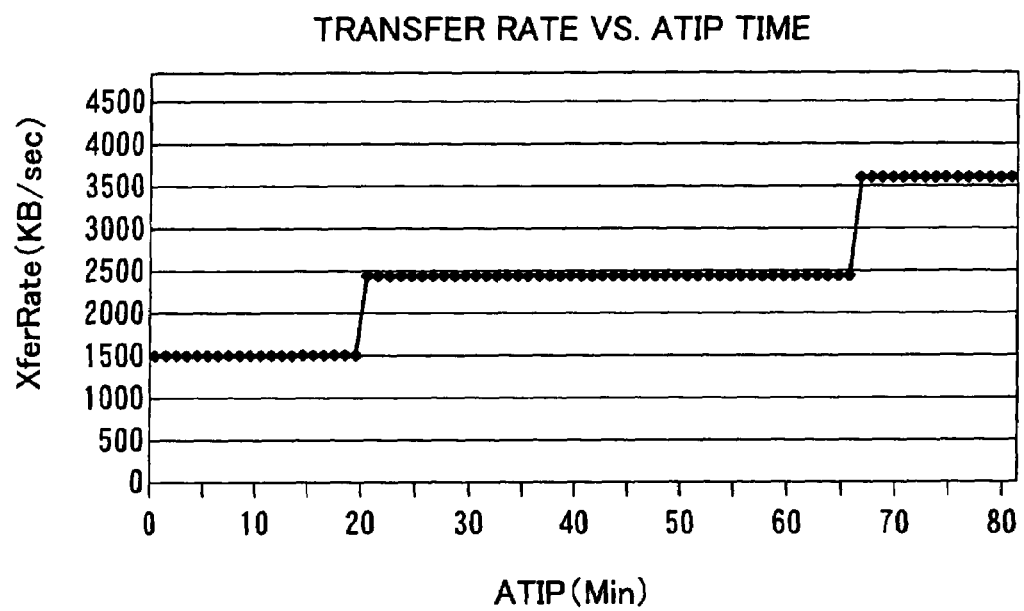
FIG. 8 shows a relationship between a transfer rate and ATIP when the zone CLV table shown in FIG. 4 is used for recording in the disk recording apparatus according to the first embodiment of the present invention.
Figure 9:
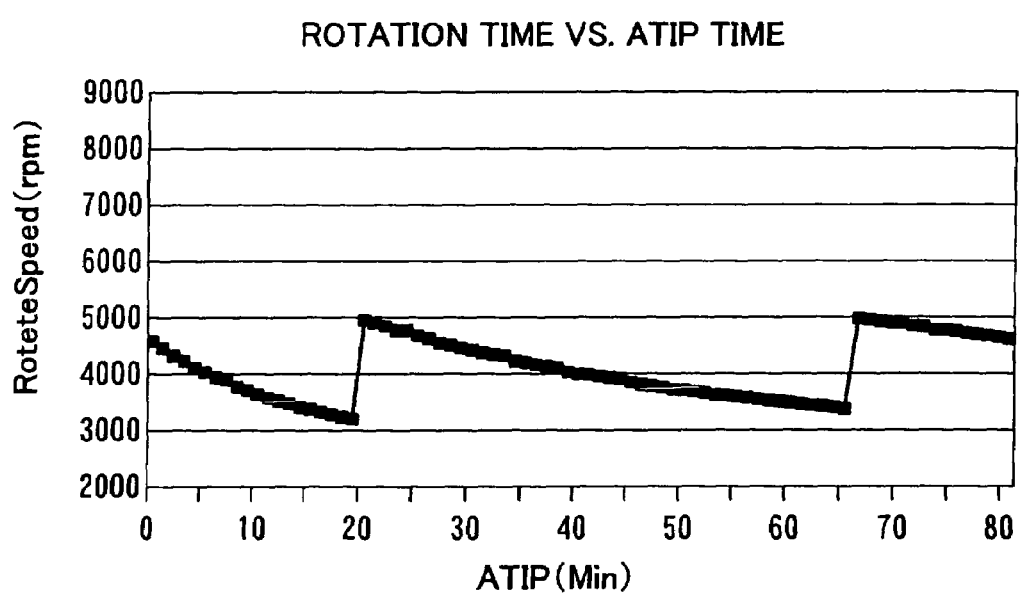
FIG. 9 shows a relationship between a rotation speed and ATIP when the zone CLV table shown in FIG. 4 is used for recording in the disk recording apparatus according to the first embodiment of the present invention.

FIG. 8 shows the relationship between the transfer rate (Xfer Rate) and ATIP in the case where the zone CLV table shown in FIG. 4 is used for recording. The relationship between the rotation speed (Rotate Speed) and ATIP in the same case is shown in FIG. 9.

Figure 10:
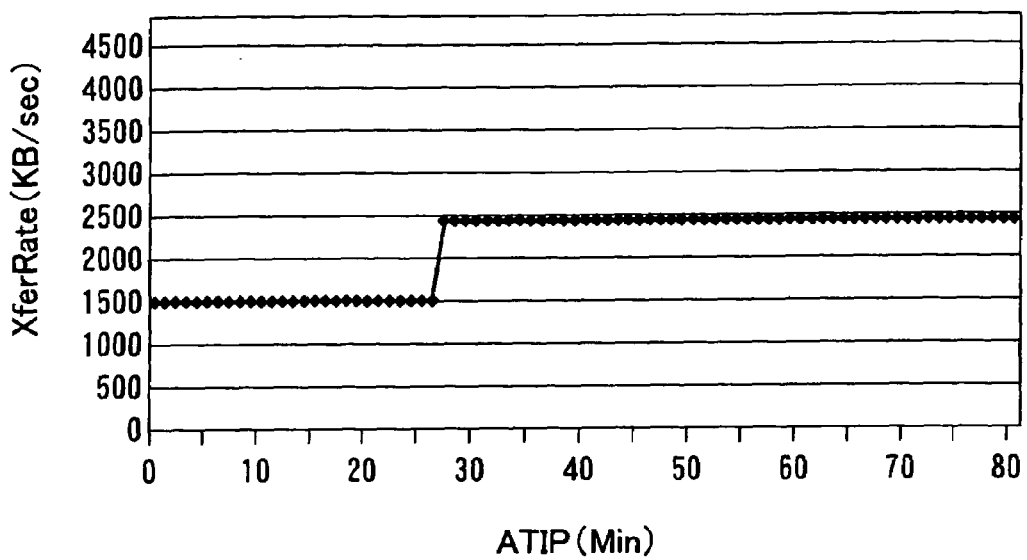
FIG. 10 shows a relationship between a transfer rate and ATIP when the zone CLV table shown in FIG. 5 is used for recording in the disk recording apparatus according to the first embodiment of the present invention.
Figure 11:
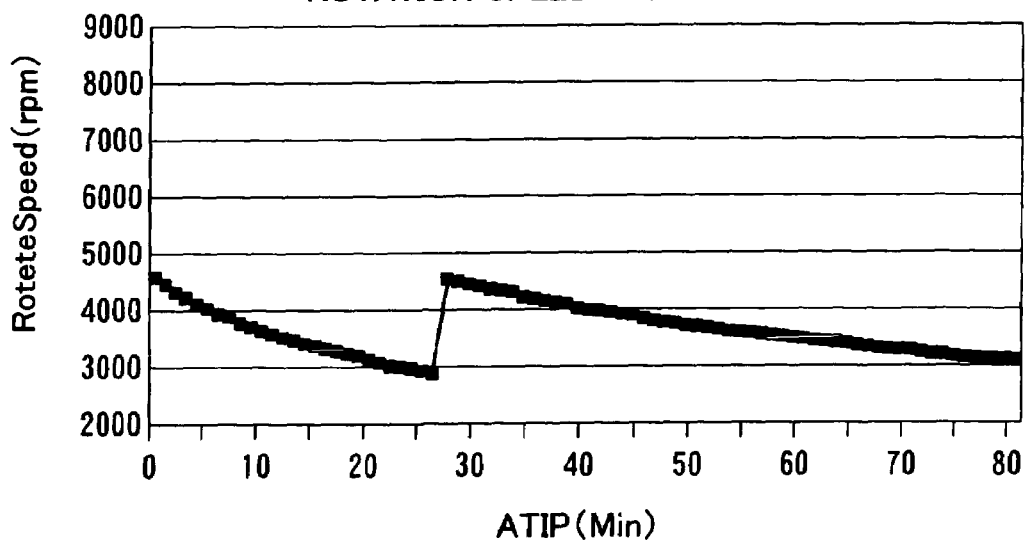
FIG. 11 shows a relationship between a rotation speed and ATIP when the zone CLV table shown in FIG. 5 is used for recording in the disk recording apparatus according to the first embodiment of the present invention.

FIG. 10 shows the relationship between the transfer rate (Xfer Rate) and ATIP in the case where the zone CLV table shown in FIG. 5 is used for recording. The relationship between the rotation speed (Rotate Speed) and ATIP in the same case is shown in FIG. 11.

As shown in FIGS. 6 to 11, zoning and recording speed setting for each zone are performed so that a high transfer rate is achieved for each zone that does not exceed its upper-limit rotation speed.

In the first embodiment, as has been described, the eccentricity is measured during activation of a disk, the upper-limit rotation speed suited to the condition of the disk recording medium placed in the apparatus is calculated to set an optimum zone CLV table, as described above. Therefore, the apparatus can minimize the servo error and consequently avoid servo failures during recording data on a bad-condition disk recording medium such as one with a high eccentricity or axial run-out. In the case of a disk recording medium on which data cannot be recorded at the maximum rotation speed (5,500 rpm), zone CLV speed change positions are changed in sequence so that the recording speed for the last zone becomes as close to the maximum recording speed specified in the apparatus or disk recording medium as possible. Because the highest possible recording speed can be achieved in this way, recording time can be minimized.

While the zone CLV tables are set on the basis of the eccentricity in the first embodiment described above, other parameters such as the axial run-out or the rate of time information reading, which will be described later, may be used. The number of upper-limit rotation speeds (zone CLV tables) is not limited to three, of course. Furthermore, a zone CLV table may be computed on the basis of the upper-limit rotation speed or may be chosen from a number of pre-stored zone CLV tables in accordance with the upper-limit rotation speed.

SECOND EMBODIMENT

Figure 12:
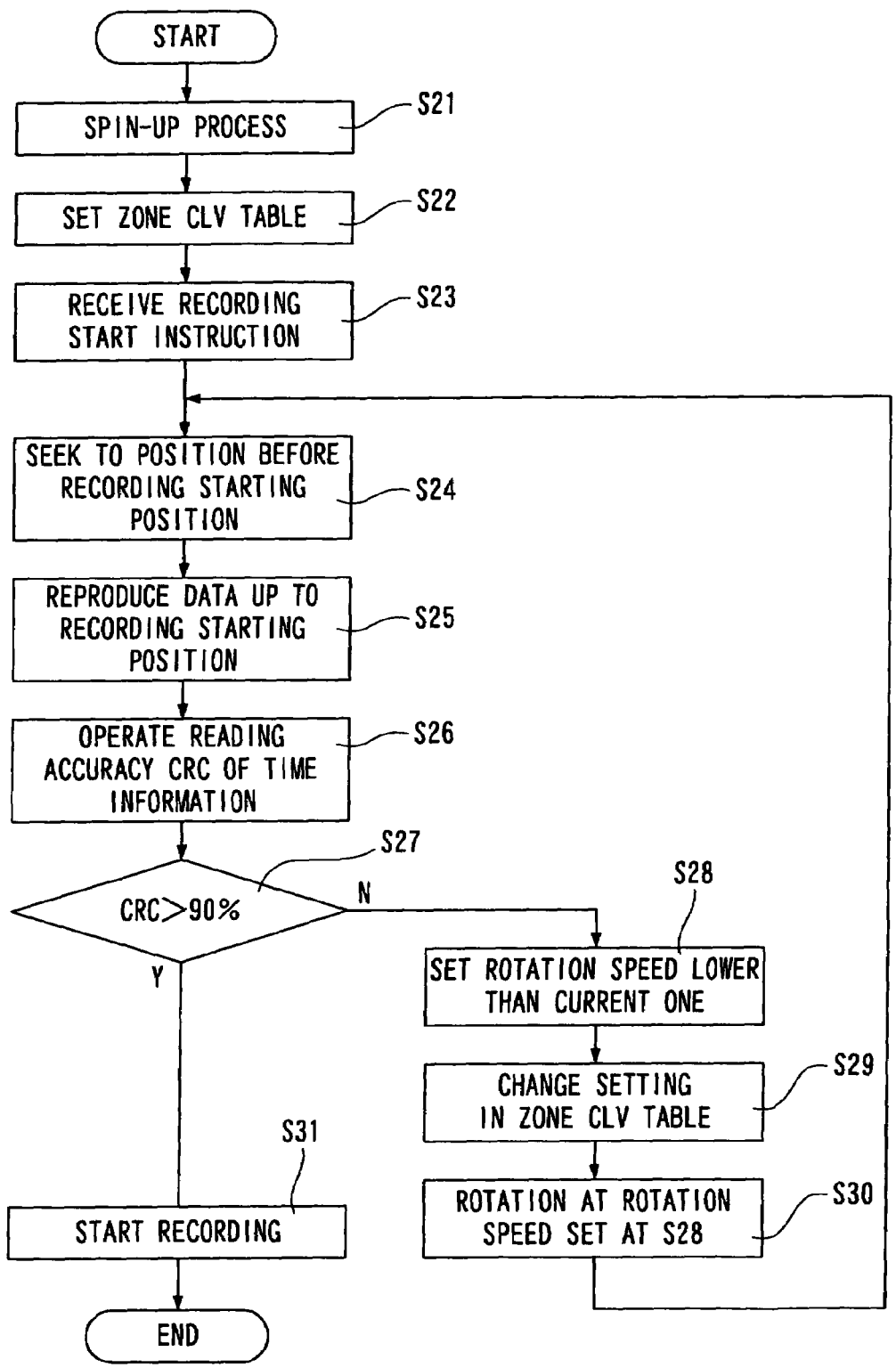
FIG. 12 is a flowchart of an operation performed when recording is started in a disk recording apparatus according to a second embodiment of the present invention.

A disk recording apparatus according to a second embodiment will be described below. In the first embodiment described above, a zone CLV table is set on the basis of the eccentricity of a disk recording medium which is measured at a predetermined position and rotation speed during disk activation. The second embodiment differs from the first embodiment described above in that the readability of time information (SubQ or ATIP) in a area before or/and after the recording starting position is measured and a zone CLV table is set based on the readability. Operation performed by the disk recording apparatus during starting recording will be described with reference to the flowchart shown in FIG. 12. It is assumed in the second embodiment that the accuracy of reading time information is measured as the reading accuracy of time information.

When a disk recording medium 111 is placed into the apparatus 113, the CPU 101 performs a spin-up process as in the first embodiment described above (step S21). After the completion of the spin-up process, the CPU 101 sets a zone CLV table shown in FIG. 3 in which the upper limit is limited by a maximum rotation speed of 5,500 rpm, for example, and stores it in a RAM 102 in preparation for reading (step S22).

Then, the CPU 101 receives a recording start instruction from a host computer 114 through an interface (step S23), causes an optical pickup 107 to seek to a position before a recording starting position (step S24), then refers to the zone CLV table stored in the RAM 102 to set the rotation speed to be used at the recording staring position in a speed change circuit 108 and an EFM encode/decode circuit 104. Then, it performs reproduction in the section from the seek position to the recording starting position (step S25), calculates the reading accuracy CRC (Cyclic Redundancy Check) of time information read by the EFM encode/decode circuit 104 (step S26), and determines whether the CRC is greater than 90% (step S27). SubQ or ATIP may be used in the calculation of the reading accuracy CRC. While the time information is read from the section from the seek position to the recording starting position, it may be read from any other area before or/and after the recording starting position (including the area following the recording starting position).

If the determination at step S27 is affirmative, that is, if the reading accuracy CRC is greater than 90%, then the process proceeds to step S31, where reading is started.

On the other hand, if the determination at step S27 is negative, that is, if the reading accuracy CRC is less than 90%, then the process proceeds to step S28, where the current rotation speed is replaced with a lower rotation speed. Then, the settings in the zone CLV table are changed at step S29 and the motor 110 is rotated at the rotation speed set at step S28 (step S30). The changing of settings in the zone CLV table at step S29 can be performed in a manner similar to that in the first embodiment, for example. That is, the upper-limit rotation speed is limited to 5,000 rpm, which is lower than a maximum rotation speed of 5,500 rpm, zoning is done based on the upper-limit rotation speed information, the recording speed information specified in the apparatus, and recording speed information that is specified in the disk recording medium and was read during spin-up process, and the maximum recording speed is chosen for each zone from among the recording speeds specified in the apparatus and supported by the disk recording medium so that disk recording medium is rotated at a lower speed than the upper-limit rotation speed (5,000 rpm).

Thus, a zone CLV table as shown in FIG. 4 is provided. Steps S28 and S29 may be replaced with each other. Then, the process returns to step S24, where the optical pickup 107 is seeked to a position before the recording starting position while the disk is rotating at the given rotation speed.

Then steps S25 to S27 are performed at the rotation speed in the updated zone CLV table. If the determination is still negative, settings are changed so that a zone CLV table as shown in FIG. 5 is provided.

In this way, in the second embodiment, the reading accuracy CRC of time information read from a area before or/and after the recording staring position is measured before starting recording, an optimum zone CLV table for the recording stating position is set based on the measurement. Consequently, an optimum zone CLV table can be set for the remaining recording area and therefore more stable recording can be achieved.

While the second embodiment has been described with respect to an example in which the zone CLV table is set on the basis of the reading accuracy of time information, a zone CLV table can also be set on the basis of the axial run-out or eccentricity of the disk recording medium. The zone CLV table set at step S22 is not limited to the one shown in FIG. 3. Furthermore, the zone CLV table may be set at step S22 by performing the process described in the first embodiment.

THIRD EMBODIMENT

Figure 13:
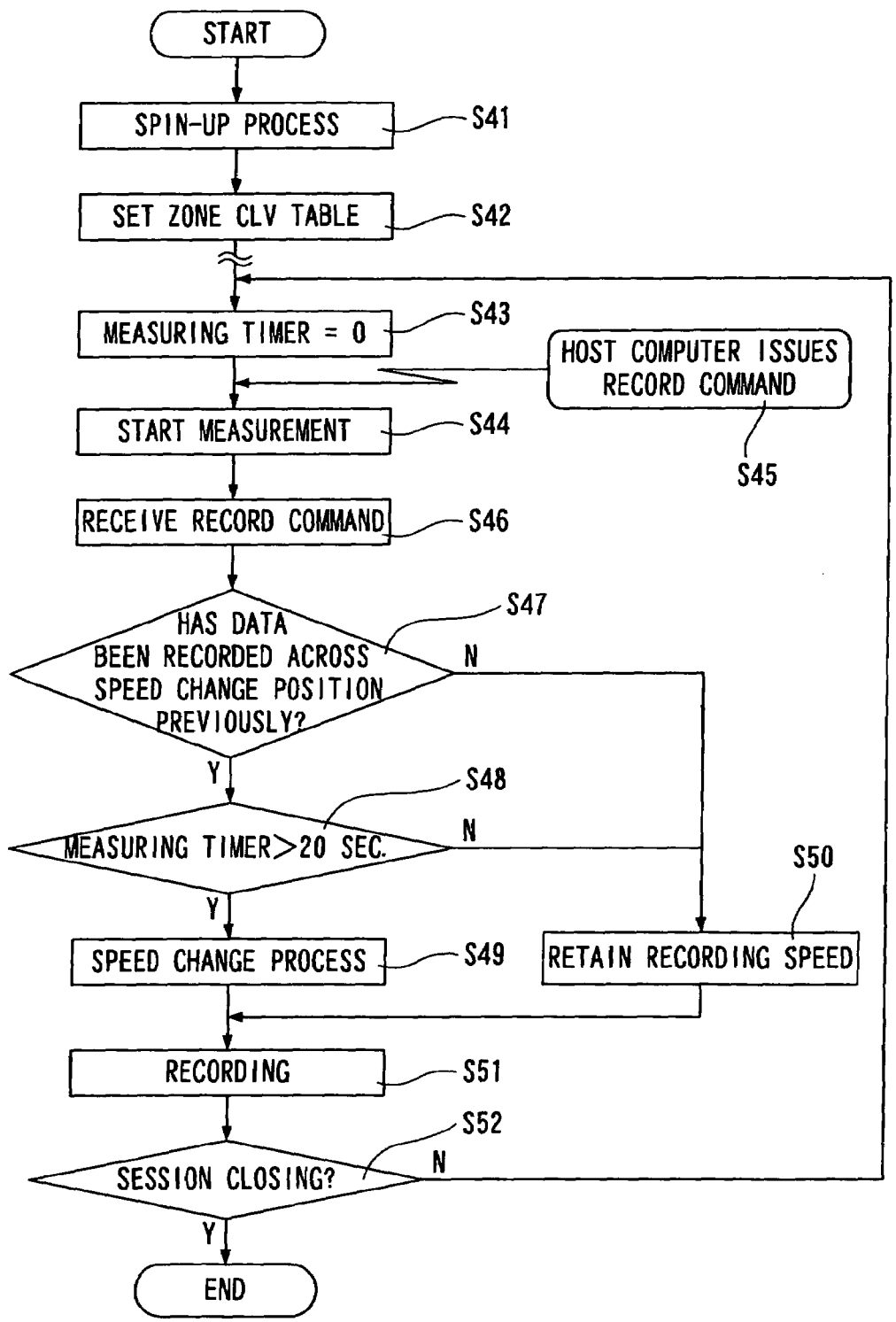
FIG. 13 is a flowchart of an operation performed when packet recording is performed in a disk recording apparatus according to a third embodiment of the present invention.

A disk recording apparatus according to a third embodiment of the present invention will be described below. The disk recording apparatus according to the third embodiment differs from those of the first and second embodiments in that a measuring timer (not shown) is provided for measuring the interval between receptions of commands from a host computer 114 during packet recording. Operation of the disk recording apparatus during packet recording will be described with reference to the flowchart in FIG. 13.

When a disk recording medium 111 is placed in the apparatus 113, the CPU 101 performs a spin-up process as in the first and second embodiments (step S41). After the completion of the spin-up process, the CPU 101 sets a zone CLV table as shown in FIG. 3, for example (step S42). When a command to record packet data is issued from a host computer 114 to start packet data recording, the CPU 101 performs an operation for recording the first packet data. If a speed change position is detected during recording the first packet, that is, if the first packet data is recorded across a speed change position, a speed change process is performed according to the zone CLV table after the recording. Then, the CPU 110 initializes the measuring timer for measuring the interval between receptions of record commands from the host computer 114 to 0 (step S43), starts measurement, and waits for the next record command at step S44.

When a command to record packet data is issued from the host computer 114 at step S45 and the CPU 101 receives the record instruction through the interface 112 (step S46), the CPU 101 determines whether it detected a speed change position while it was recording the previous packet data, that is, whether the packet data was recorded across a speed change position (step S47). If the CPU 101 did not detect a speed change position or the previous packet data is the first packet data, then the CPU 101 proceeds to step S50 and then to step S51 while keeping the current recording speed. If the CPU 101 detected a speed change position (but the previous packet data is not the first packet data), then it proceeds to step S48, where it determines whether the value of the measuring timer exceeds 20 seconds (predetermined time). If the determination is affirmative, that is, if the measuring timer value exceeds 20 seconds, then the CPU 101 proceeds to step S49, where it performs a speed change operation according to the set zone CLV table. Then it proceeds to step S51. If the determination is negative, that is, if the measuring timer value does not exceed 20 seconds, the CPU 101 proceeds to step S50 and then to step S51 while keeping the current recording speed.

At step S51, the CPU 101 performs a packet recording operation and determines whether the packet recording operation is a session closing operation at step S52. If the determination is negative, that is, if the operation at step S51 is not a session closing operation, then the CPU 101 returns to step S43, where it initializes (resets) the measuring timer value, and then starts measurement and waits for the next record instruction at step S44.

Then, the process from step S43 to step S52 is repeated until a session closing operation is performed at step S51.

The zone CLV table set at step S42 is not limited to the zone CLV table shown in FIG. 3.

According to the third embodiment, the interval between receptions of record commands from the host computer are measured during packet recording and, if a zone boundary is detected within the predetermined record command reception interval, the current recording speed is maintained and recording is continued at the rotation speed. Thus, the speed change time can be saved. Consequently, recording time taken for packet recording that ends at a position immediately following a speed change position can be reduced.

Furthermore, when an instruction to perform reproduction from a recorded area is issued by a user before session closing, faster read access can be performed because recording speed is not changed. In such a case, read access to the area in which packets have been recorded and for which the session has not been closed is performed on the basis of the rotation speed set in the zone CLV table.

In the third embodiment, packet recording is continued without changing the recording speed even if a speed change position is detected. Similarly, for track-at-once recording, recording in a read-out area can be continued at a recording speed used for recording in a read-in area even if a speed change position is detected in the read-in area during session closing. Unlike in packet recording, measurement by the timer is not required in the track-at-once recording.

According to the prior art, if a speed change position is detected in a read-in area during session closing, the speed is changed before recording in a read-out area and this speed change time adds to unnecessary time in session closing. According to the present embodiment, in contrast, speed is not changed even if a speed change position is detected in a read-in area, therefore an increase in time for session closing which would be introduced by a speed change operation can be avoided. Furthermore, the session closing can be performed in a stable condition with a constant recording speed.

FOURTH EMBODIMENT

A disk recording apparatus according to a fourth embodiment will be described below. The disk recording apparatus according to the fourth embodiment calculates the upper-limit rotation speed based on a parameter such as the eccentricity and performs zoning and sets a recording speed for each zone as in the first and second embodiment described above. The fourth embodiment differs from the first and second embodiments in that if it is determined that data cannot be recorded due to a servo failure in a speed change, or if buffer-under-run occurs due to interruption of a data flow from a host compute during recording and it is determined that data cannot be recorded due to a servo failure after recording is resumed, one of the recording speeds in a set zone CLV table that is lower than the new recording speed or than the recording speed that was being used when the recording was halted is used to continue recording. Operation of the disk recording apparatus when recording is halted (due to a speed change or buffer-under-run error) will be described with reference to the flowcharts in FIGS. 14 and 15.

When a disk recording medium 111 is placed in the apparatus 113, the CPU 101 performs a spin-up process as in the first and second embodiments described above (step S61). After the completion of the spin-up process, the zone CLV table shown in FIG. 3, for example, is set (step S62). When a record command is issued from a host computer 114, the CPU 101 performs a record starting process (step S63) and records data transferred from the host computer 114 (step S64). The zone CLV table used at step S62 is not limited to the one shown in FIG. 3. The zone CLV table may be set by performing the process according to the first embodiment described above.

When recording is halted, the CPU 101 determines at step S65 whether or not the halt has been caused by a buffer-under-run error or a speed change. If the determination is affirmative, that is, if the halt has been caused by a buffer-under-run or speed change, the process proceeds to step S68; otherwise it proceeds to step S66. At step S66, the CPU 101 determines whether the halt is due to the end of recording. If the halt is due to the end of recording, then the CPU 101 proceeds to step S67, where it performs a record termination process; otherwise, it returns to step S64 to continue the recording process.

Figure 15:
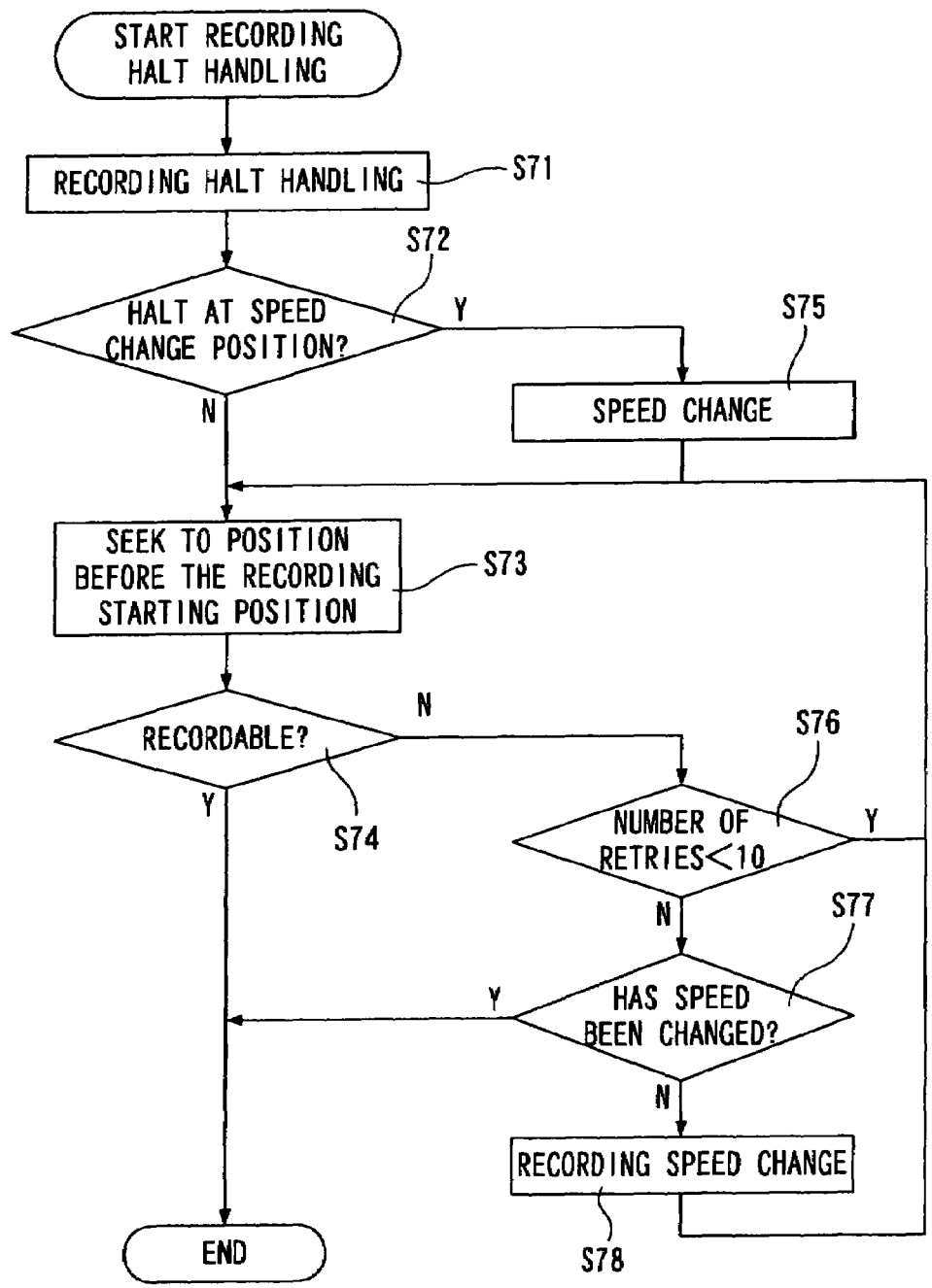
FIG. 15 is a flowchart of an operation performed when recording is resumed in the disk recording apparatus according to the fourth embodiment of the present invention.

Details of a recording halt/resume handling process performed at step 68 will be described below. As shown in FIG. 15, if a halt due to a buffer-under-run or speed change occurs, recording halt handling is first performed at step S71 and determination is made as to whether the halt has been caused by a speed change. If the determination is affirmative, that is, if the cause of the halt is a speed change, then the process proceeds to step S75, where the speed is changed according to the set zone CLV table, then the process proceeds to step S73. On the other hand, if the determination is negative, that is, if the cause of the halt is a buffer-under-run, the process directly proceeds to step S73.

At step S73, a seek is made to a position before the speed change position if the cause of the halt is a speed change, or to a position before the position at which the recording halt has occurred if the cause is a buffer-under-run. At step S74, reproduction is performed in the section from the seek position to the recording starting position, at the new rotation speed if the cause of the halt is a speed change, at the new rotation speed during the halt if the cause of the halt is the buffer-under-run and servo controls are performed. If this causes a servo failure and it is determined that data cannot be recorded, then the process proceeds to step S76, where determination is made as to whether the number of retries at that rotation speed exceeds 10, for example. If the number of retries does not exceed 10, then a retry or retries are performed at steps S73 and S74.

Figure 14:
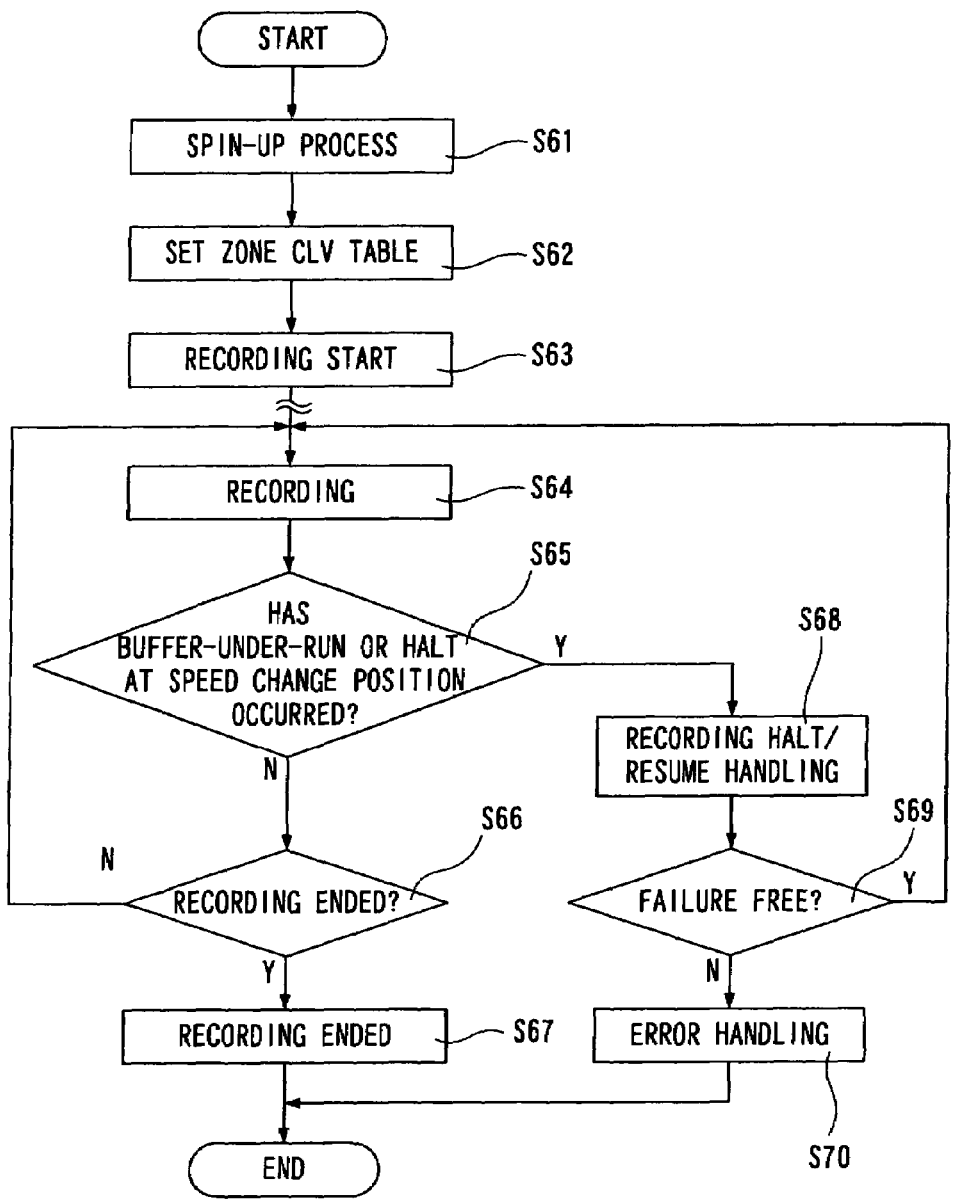
FIG. 14 is a flowchart of an operation performed when recording is halted in a disk recording apparatus according to a fourth embodiment of the present invention.

If the determination at step S74 is affirmative, that is, if no servo failure occurs after the servo adjustment and it is determined that data can be recorded, the recording halt/resume handling ends and the process proceeds to step S69 in FIG. 14.

If data cannot be recorded after 10 retries, then determination is made as to whether the current speed is the new rotation speed (step S77). If the retires has failed at the new rotation speed or the same rotation speed that was being used on the halt, the determination at step S77 will be negative and the process proceeds to step S78. At step S78, the recording speed is set to one of the recording speeds used in the set zone CLV table that is lower than the new recording speed or than the recording speed used when the halt occurred.

Then the process returns to step S73 and starts a retry again. If the retry fails, the determination at step 77 will be affirmative and thus the recording halt/resume handling ends and the process proceeds step S69 FIG. 14.

At step S69 in FIG. 14, determination is made as to whether the recording halt/resume handling has caused no servo failure. If the determination is affirmative, that is, if no servo failure has caused, then the process returns to step S64 and the recording is continued. On the other hand, if the determination is negative, that is, if a servo failure has occurred, then the process proceeds to step S70, where error handling, namely a recording termination process due to servo failure occurrence is performed.

If the next speed change position is detected while recording is being continued, a speed change is performed according to the set zone CLV table and, if a buffer-under-run occurs, the recording speed is reset to the unlowered recording speed and the recording halt/resume handling is performed.

According to the fourth embodiment as described above, if recording at a new recording speed fails after recording speed change or recording at the recording speed that was being used when recording was halted fails, the recording can be continued at any of the recording speeds set for each zone that is lower than that recording speed. Therefore, recording can be performed even in a situation where servo failures would occur frequently due to deterioration of the drive (for example deterioration of the optical pickup) in the prior art or where data is recorded on a bad-condition disk recording medium that would often cause servo failures in the prior art.

The invention claimed is:

1. A disk recording apparatus comprising:
a unit for rotating a constant-linear-density-formatted disk recording medium at a plurality of rotation speeds;
a unit for measuring eccentricity of said disk recording medium, or measuring axial run-out of said disk recording medium, or measuring readability of time information recorded on said disk recording medium, at any position during disk activation; and
a table setting unit for calculating an upper-limit rotation speed based on the measurement of the eccentricity, the axial run-out or the time information readability, and dividing a recording area of said disk recording medium into a plurality of sub-recording-areas and setting for each of said sub-recording-areas a maximum recordable rotation speed from among said plurality of rotation speeds so that rotation exceeding said upper-limit rotation speed is prevented, wherein:
the time information recorded on said disk recording medium is read and when a boundary of each of said sub-recording-area is found, the rotation speed is changed according to the table set by said table setting unit and recording is performed at the changed speed, and
the disk recording apparatus further comprises:
a unit for measuring an interval between record command receptions during packet recording, wherein:
when a boundary of said sub-recording-area is found during packet recording and said interval between record command receptions is within a predetermined time interval, the rotation speed is not changed and recording is performed at the same speed.

2. The disk recording apparatus according to claim 1, wherein when track-at-once session closing is performed, recording in a read-in area and a read-out area is performed while maintaining the rotation speed at which the recording in the read-in area is started.

3. The disk recording apparatus according to claim 1, wherein if recording at the changed rotation speed fails, recording is performed at any of said plurality of recording speeds that is lower than the changed rotation speed.

4. The disk recording apparatus according to claim 1, wherein when recording is halted, the recording is resumed at the rotation speed that is set during the halt, and when the recording fails, the recording is performed at any of said plurality of recording speeds that is lower than said rotation speed set during the halt.

* * * * *